(12) United States Patent
Uematsu

(10) Patent No.: US 6,778,508 B1
(45) Date of Patent: Aug. 17, 2004

(54) MULTIPLE ACCESS COMMUNICATION SYSTEM

(75) Inventor: Akira Uematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/456,013

(22) Filed: Dec. 7, 1999

(30) Foreign Application Priority Data

Dec. 8, 1998 (JP) ............................................ 10-348987

(51) Int. Cl.$^7$ ............................................ H04B 7/204
(52) U.S. Cl. ...................................... 370/319; 370/321
(58) Field of Search ................................ 370/329, 337, 370/349, 322, 348, 319, 321

(56) References Cited

U.S. PATENT DOCUMENTS

| | | | | |
|---|---|---|---|---|
| 5,185,737 A | * | 2/1993 | Nassehi et al. | 370/449 |
| 5,278,833 A | * | 1/1994 | Crisler et al. | 370/348 |
| 5,590,131 A | * | 12/1996 | Kabatepe | 370/461 |
| 6,091,717 A | * | 7/2000 | Honkasalo et al. | 370/329 |
| 6,452,933 B1 | * | 9/2002 | Duffield et al. | 370/415 |

FOREIGN PATENT DOCUMENTS

| | | |
|---|---|---|
| JP | 3-62329 | 9/1991 |
| JP | 06-112875 | 4/1994 |
| JP | 7-264115 | 10/1995 |
| JP | 8-213990 | 8/1996 |
| JP | 8-214027 | 8/1996 |
| JP | 8-265241 | 10/1996 |

OTHER PUBLICATIONS

Article—Proceedings of the 1998 Communications Society Conference of IEICE—Sep. 29–Oct. 2, 1998; Yamanashi University, KOFU (The Institute of Electronics, Information and Communication Engineers).

Zhang; "Service Disciplines for Guaranteed Performance Service in Packet–Switching Networks"; Proceeding of the IEEE; vol. 83, No. 10; Oct. 1995; pp. 1374–1396.

* cited by examiner

Primary Examiner—Wellington Chin
Assistant Examiner—Raj Jain
(74) Attorney, Agent, or Firm—Foley & Lardner LLP

(57) ABSTRACT

To achieve high throughput by using random reservation scheme, when traffic is heavy in multiple access communication system. Further, to suppress signal delay by using both random reservation scheme and random access scheme, when the traffic is low. Scheduling means holds a flag which indicates that there is no allocation of transmission bandwidth for a long packet reservation information stored in long packet reservation queue. The flag is checked, after the allocation of data transmission bandwidth is started. When the flags are set, bandwidths are allocated firstly for long packets, and secondly for short packets. On the other hand, when the flag is not set, bandwidths are allocated firstly for short packets, and secondly for long packets.

9 Claims, 14 Drawing Sheets

MULTIPLE ACCESS COMMUNICATION SYSTEM

BACKGROUND OF THE INVENTION

1. Technical Field of the Invention

The present invention relates to a multiple access communication system such as, but not limited to, a CATV network, or a wide area network (WAN).

2. Description of the Prior Art

Conventionally, a WAN such as a satellite communication system, or cable modem system holds communication medium in common, and a key station and a plurality of user stations communicate with each other via this medium. Control signals and data signals from the key station are broadcasted on a broadcast type communication channel to all of the user stations, while data signals from user stations to the key station are transmitted on multiple access type channel by time division multiple access (TDMA) scheme. In general, a WAN has several hundreds or several thousands of user stations, but much fewer user stations are transmitting data simultaneously. Therefore, so-called demand-assign-multiple-access scheme which allows only the user stations demanding data transmission to use the communication channel is efficient in WAN. Well-known demand-assign-multiple-access schemes are random reservation scheme and random access scheme. By random reservation scheme, the key station allocates bandwidth on multiple-access type channel for reservation. User stations demanding data transmission send reservation packets in the allocated bandwidth for reservation. When reservation packets collide, the key station resolves the collision. The key station allocates bandwidth according to the reservation. Then user stations which have won the bandwidth transmit data packets without collision. By random access scheme, the key station allocates bandwidth on multiple-access type channel for data transmission, user stations demanding data transmission send data packets in the allocated bandwidth for data. When data packets collide, the key station resolves the collision.

However, the conventional demand-assign-multiple-access schemes as explained above have following disadvantages. Random reservation scheme achieves good throughput under highly loaded conditions, but has a disadvantage that even under collisionless conditions, packets suffer delay due to reservation process. By random access scheme, delay of data packet is minimum, when any collision does not occur. But, loss of bandwidth is large, when data packets collide. Therefore, in highly loaded conditions, the probability of collision rises and the throughput degrades.

Further, in such a multiple-access communication system that the bandwidth for data from user stations are allocated by the key station according to reservation from user stations, the user stations may not be treated fairly, when lengths of data packets are different and bandwidths are allocated in order of reception of reservation by the key station. Therefore, in order to achieve the fairness among the user stations, the so-called weighted fair queueing is employed as the bandwidth allocation scheme which schedules data transmission from the user stations on the basis of the reception time of reservation and the packet length of reservation, as disclosed in "Service Disciplines for Guaranteed Performance Service in Packet-switching Networks" by Zhan, Proceedings of the IEEE, vol. 83, No. 10, October 1995, pp 1374–1396. However, these algorithms such as the weighted fair queueing increases a load on CPU, when reservations from the user stations come frequently, which is the case in such a system that includes great many user stations.

SUMMARY OF THE INVENTION

Therefore, an object of the present invention is to obtain high throughput by using the random reservation scheme only, when a lot of data is transmitted by user stations. Further, another object of the present invention is to suppress delay due to reservation process by using random access scheme in addition to random reservation scheme, when the traffic is low.

In the multiple access communication system of the present invention, the key station has means to allocate bandwidth on multiple access channel for user stations to send reservation packets in random reservation scheme, means to allocate bandwidth on multiple access channel for user stations to send data packets in random access scheme, and means to allocate bandwidth on multiple access channel for user stations to send data packets according to the reservation received by the key station. Further, the key station monitors traffic on the multiple access channel in order to control the bandwidth on multiple access channel for user stations to send data in random access scheme. Concretely, when the traffic is low, more bandwidth for user data in random access scheme is allocated. On the contrary, when the traffic becomes heavy, only the random reservation scheme is employed in order to assure transmission efficiency of the multiple access channel.

Further, the user station of the present invention transmits reservation information in bandwidth for random reservation and data packets in bandwidth for random access, by solving collisions on the random reservation system and random access system.

According to the present invention, when traffic on the multiple access channel is light, user stations are able to transmit directly data packets under shorter delay by using random access scheme, rather than using random reservation scheme which suffers unneglectable delay due to reservation and allocation of bandwidth for reserved data packets. Further, according to the present invention, when traffic on the multiple access channel is heavy and collisions occur frequently, the user stations are able to employ random reservation scheme to utilize the multiple access channel efficiently, rather than random access scheme in which loss of bandwidth by collision of data packets is relatively larger than that of reservation packets.

Further, if once allocated bandwidth for data packet, the user station can attach reservation information of successive transmission to the data packet. Therefore, the key station can collect information about the demand of the data transmission and can allocate bandwidth for data packet as soon as possible. Further, in order to accept reservation information from the user stations, even when traffic on multiple access channel is heavy, the key station allocates at least a certain amount of bandwidth for random reservation packets.

Furthermore, according to the present invention, user stations are treated fairly regardless of length of packets which they want to transmit, because bandwidth for short packet transmission is allocated with priority and at the same time minimum bandwidth is also guaranteed for long packet.

PREFERRED EMBODIMENT OF THE INVENTION

Figure 1:
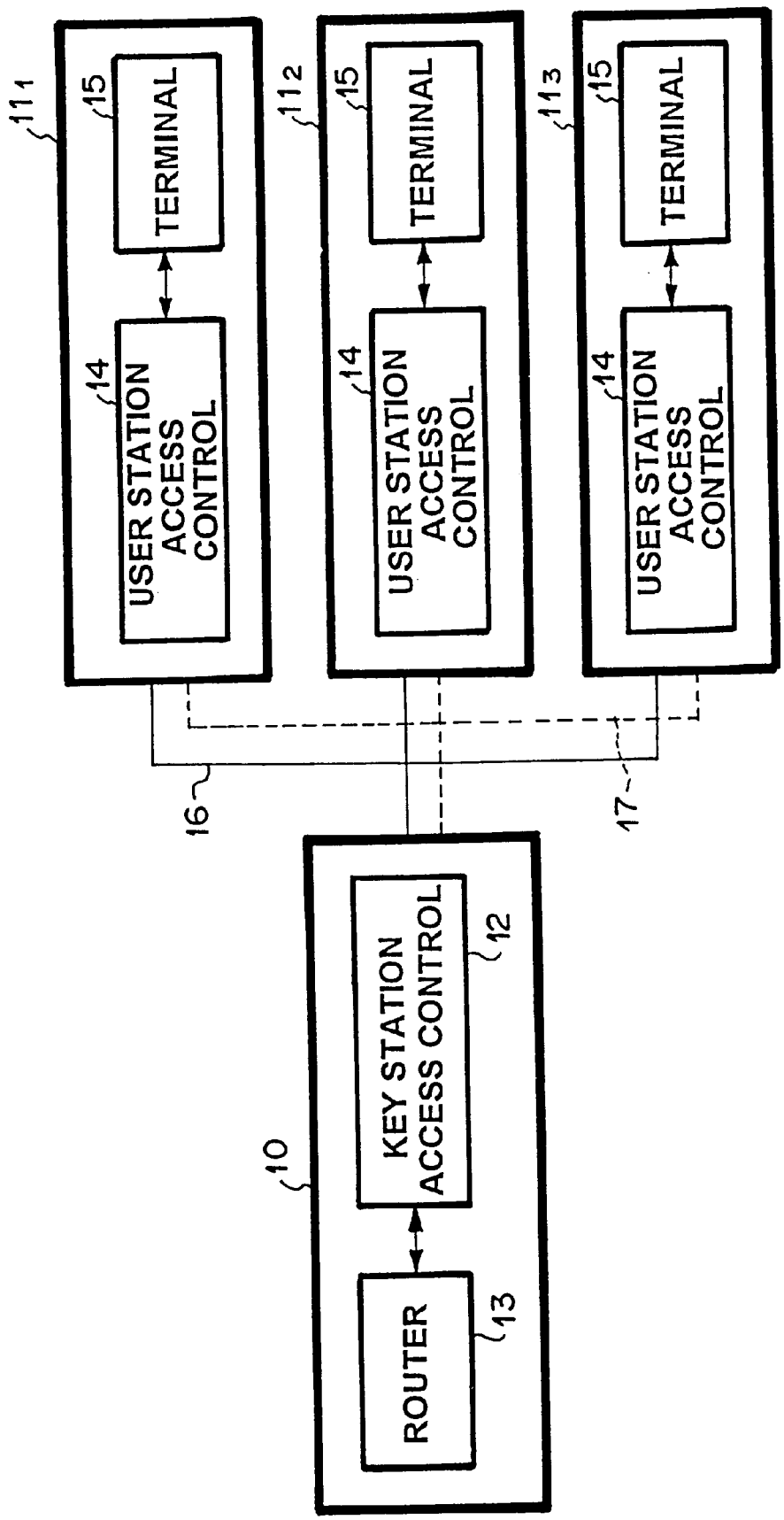
FIG. 1 is a block diagram of a multiple access communication system which is common to all the modes of embodiment of the present invention.

Four modes of embodiment of the present invention are explained, referring to the drawings.

At first, general features common to the four modes of embodiment of the present invention are explained.

A system comprising key station 10 and user stations $11_1$, $11_2$ and $11_3$ is shown in FIG. 1. Key station 10 comprises key station access control equipment 12 and router 13. Each of user stations $11_1$, $11_2$ and $11_3$ comprises user station access control equipment 14 and terminal 15. The downward data and control signal from key station 10 are transmitted through broadcast type channel 16 to all the user stations, while the upward data from user stations are transmitted through multiple access channel 17. Here, broadcast type channel 16 and multiple access channel 17 may be wired or wireless.

Figure 2:
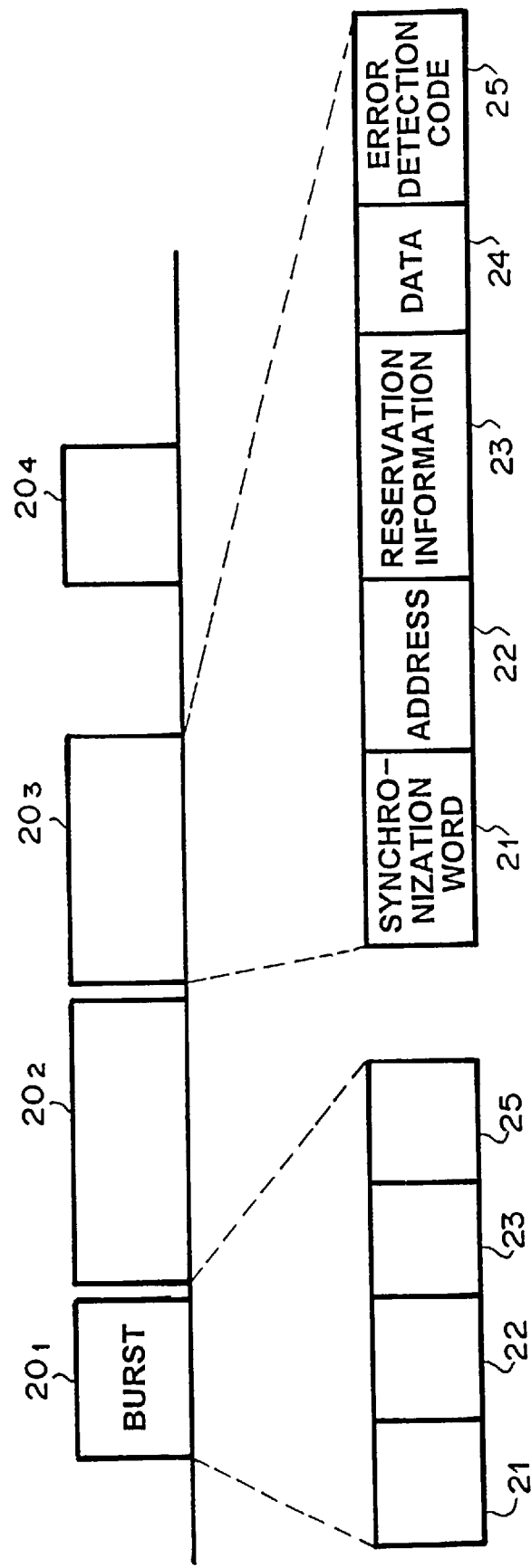
FIG. 2 is an illustration of a structure of signals from user stations to a key station in multiple access channel. The signal structure is common to all the modes of embodiment of the present invention.

A structure of signal from the user station to the key station in multiple access channel 17 is shown in FIG. 2. Burst signals $20_1$ to $20_4$ from the user stations are multiplexed on multiple access channel 17. Here, each of burst signals $20_1$ to $20_4$ comprises synchronization word 21 for synchronization, address 22 for identifying the transmitting user station, reservation 23, user data 24, and error detection code 25. In this example, there is not user data 24 in burst signal $20_1$, because burst signals $20_1$ is assumed to be used for the random reservation.

Figure 3:
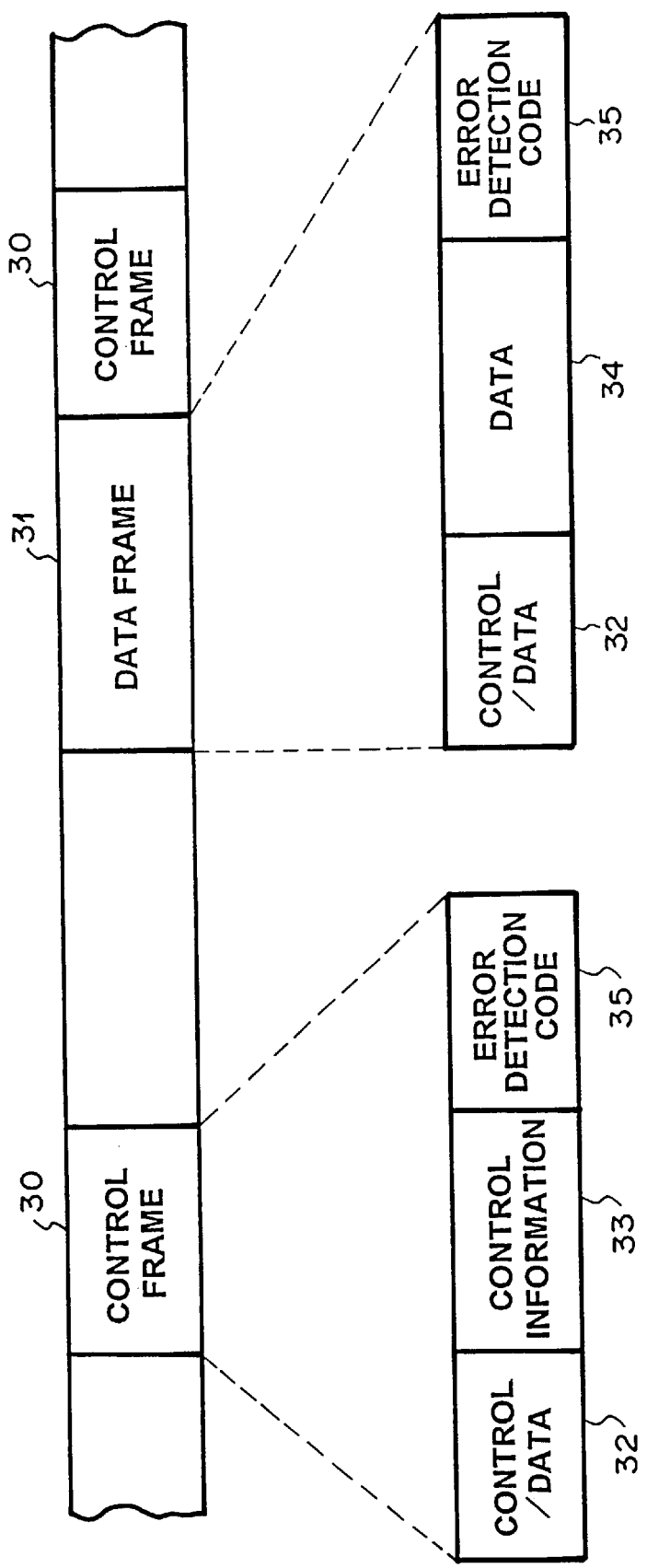
FIG. 3 is an illustration of a structure of signals from the key station to the user stations in broadcast type channels. The signal structure is common to all the modes of embodiment of the present invention.

A structure of signal from the key station to the user station in broadcast type channel 16 is shown in FIG. 3. Control frame 30 for controlling the transmission from user stations, and data frame 31 for data to be transmitted from the key station to the user station are used. These two kinds of frames may be of fixed length or of variable length. The header of the frame is identifier 32 for indicating whether it is a control frame or a data frame. Further, control frame 30 has control information 33 and error detection code 35, while data frame 31 has user data 34 and error detection code 35.

Figure 4:
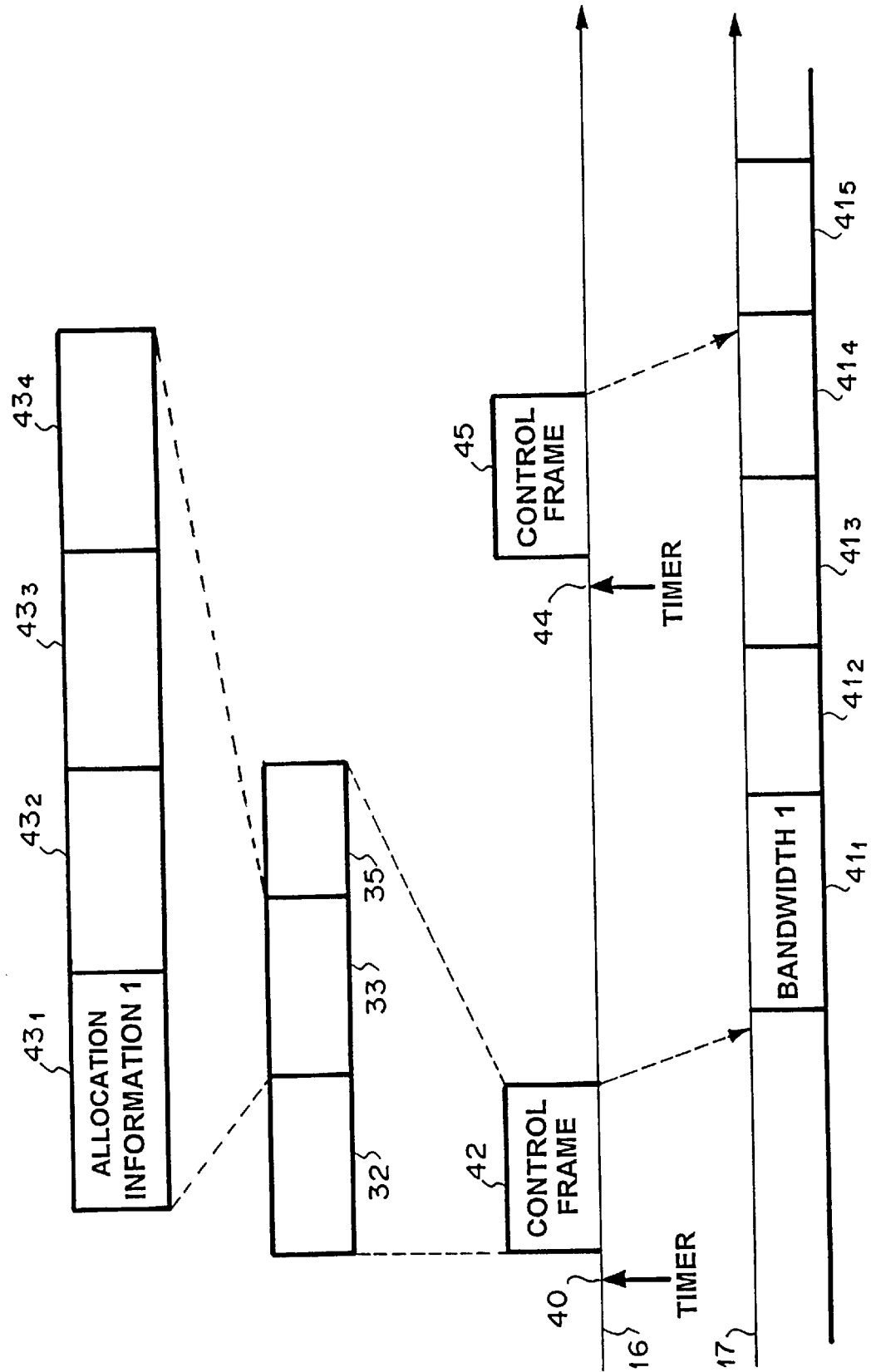
FIG. 4 is an illustration of a structure of control frames from the key station to the user stations. The signal structure is common to all the modes of embodiment of the present invention.

The format of control information 33 in control frame 30 is shown in FIG. 4. Key station access control equipment 12 as shown in FIG. 1 schedules the bandwidth allocation of multiple access channel 17 at prescribed timings, by describing a plurality of bandwidth allocation information in a single control frame. Here, bandwidth allocation information comprises a first information for indicating an allocated bandwidth, a second information for indicating the usage of the bandwidth such as data transmission, random reservation, or random access, and a third information for indicating user stations qualified to transmit data, when this is the bandwidth allocated for data transmission. In an example as shown in FIG. 4, four bandwidths $41_1$ to $41_4$ are scheduled, and scheduled information $43_1$ to $43_4$ are described in control information 33 in control frame 42 on broadcast type channel 16. At the same time, scheduling time 44 is set up in order to schedule the next bandwidth allocation starting from bandwidth $41_5$.

First Mode of Embodiment of the Present Invention

Figure 5:
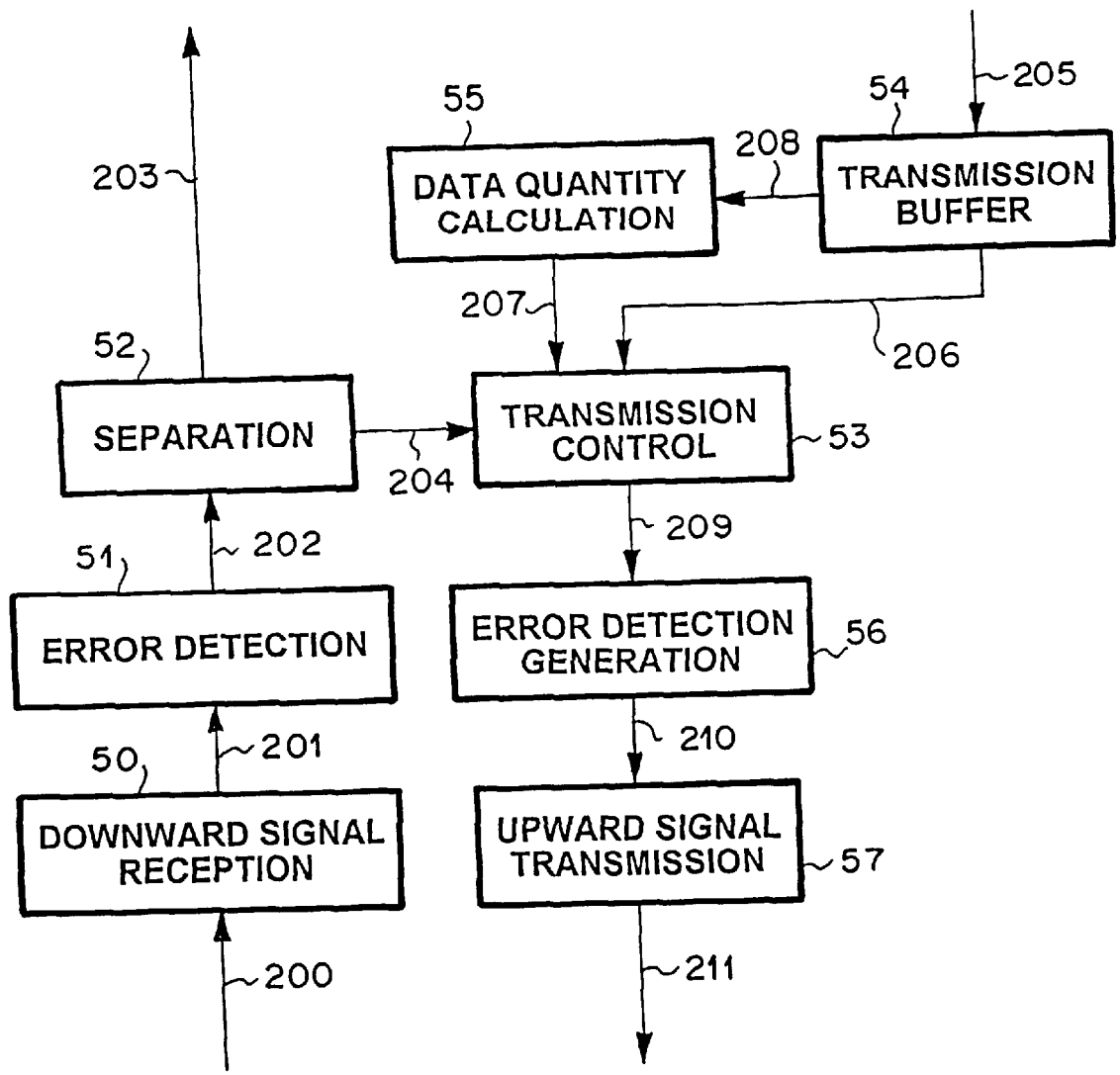
FIG. 5 is a block diagram of the user station access control equipment which is common to all the modes of embodiment of the present invention.

A block diagram of user station access equipment 14 is shown in FIG. 5. User station access equipment 14 comprises downward signal receiving means 50, error detection means 51, separation means 52, transmission control means 53, transmission buffer 54, untransmitted data calculation means 55, error detection code generation means 56, and upward signal transmission means 57.

Downward signal receiving means 50 decodes signal 200 from broadcast type channel 16, and transfer frame 201 to error detection means 51 which transfers frame 201 subtracted by error detection code to separation means 52. On the other hand, when there is an error in frame 201, error detection means 51 discards frame 201.

Separation means 52 analyzes the contents of frame 202 which is frame 201 subtracted by error detection code. When frame 202 includes data addressed to the user station as shown in FIG. 5, separation means 52 transmits user data 203 extracted from frame 202, to terminal 15. On the other hand, when frame 202 includes control information, separation means 52 transmits bandwidth allocation information 204 extracted from frame 202, to transmission control means 53.

Terminal 15 as shown in FIG. 1 writes down user data 205 to be transmitted, into transmission buffer 54.

Transmission buffer 54 transfers, to transmission control means 53, user data 206 of which byte length is specified by transmission control means 53.

Untransmitted data calculation means 55 calculates quantity of data which are not yet transmitted and therefore left in transmission buffer 54. Calculation result 207 is transferred to transmission control means 53.

Transmission control means 53 controls data transmission from the user station, according to bandwidth allocation information 204. Concretely, transmission control means 53 reads out, from transmission buffer 54, as much data 206 as the allocated bandwidth. Then, transmission control means 53 assembles transmission frame 209 comprising the address and the user data, in order to transfer frame 209 to error detection code generation means 56.

It is decided, by using random number, in order to reduce the collision, whether the reservation information should be transmitted or not. This decision is made, after the random reservation bandwidth is allocated, under the condition that there is no reservation for untransmitted data of which quantity 207 is greater than zero. When user station decides transmit reservation information, transmission frame 209 comprising the address of the user station and reservation quantity which amounts to calculation result 207, and then, frame 209 is transferred to error detection code generation means 56 at a prescribed timing. On the other hand, when user station decides not to transmit reservation information, the procedure as mentioned above is repeated.

Similar decision is made, when a random access bandwidth is allocated, under the condition that there is no reservation for untransmitted data of which quantity amounts to calculation result 207 is greater than zero. When the untransmitted data is decided to be transmitted, transmission frame 209 comprising the address of the user station as shown in FIG. 5, and then, frame 209 is transferred to error detection code generation means 56. On the other hand, when the untransmitted data is decided not to be transmitted, the procedure as mentioned above is repeated.

Error detection code generation means 56 generates error detection code to be added to transmission frame 209 which is transferred to upward signal transmission means 57. Upward signal transmission means 57 adds a synchronization word to the header of frame 210 and transmits, upon multiple access channel 17, signal 211 after coding frame 210.

Figure 6:
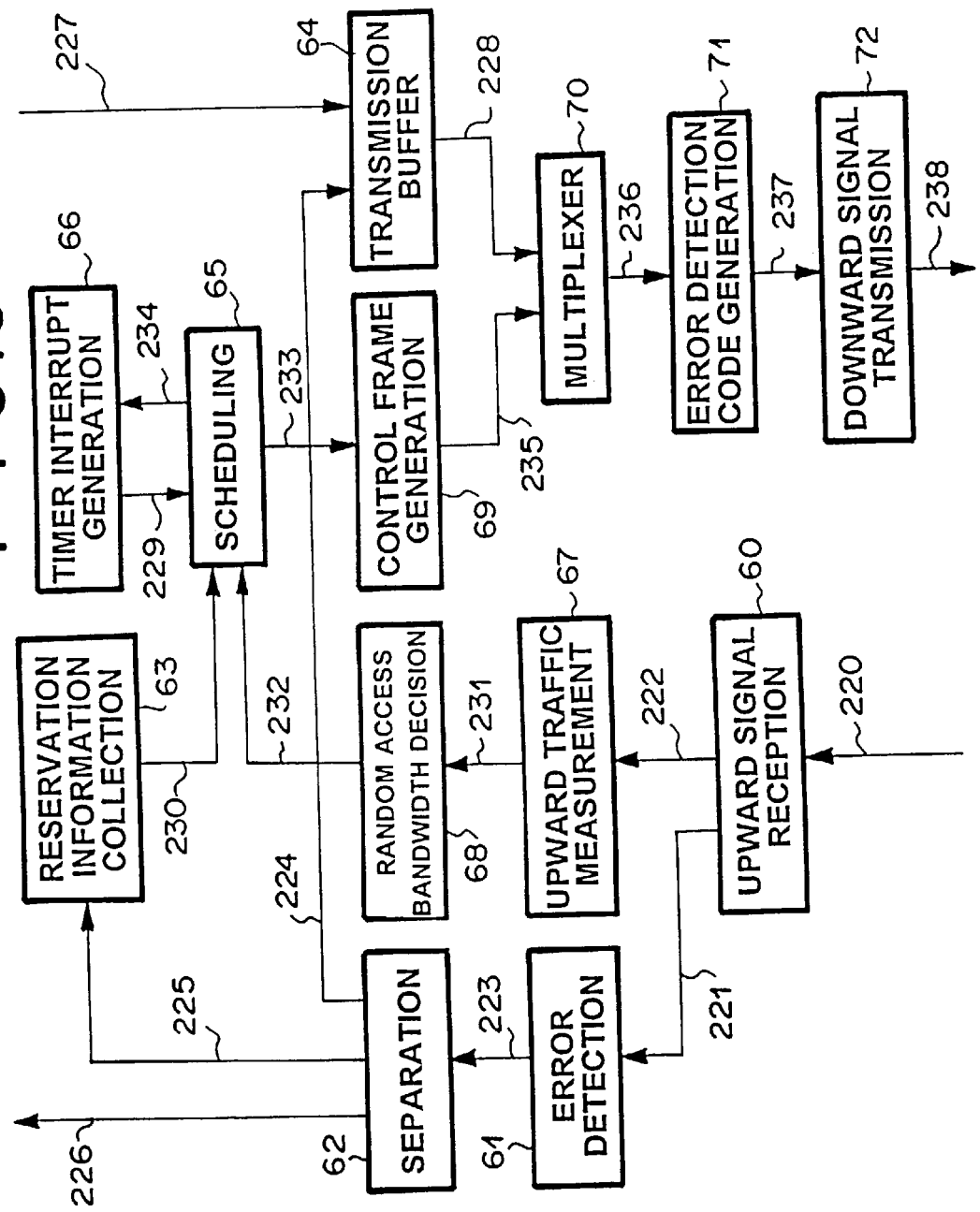
FIG. 6 is a block diagram of a key station access control equipment of the first and second modes of the present invention.

Key station access control equipment 12 is shown in FIG. 6. Key station control equipment 12 comprises upward signal receiving means 60, error detection means 61, separation means 62, reservation information collecting means 63, transmission buffer 64, scheduling means 65, timer interrupt generation means 66, upward channel traffic measurement means 67, random access bandwidth decision means 68, control frame generation means 69, multiplexer 70, error detection code generation means 71, and downward signal transmission means 72.

Upward signal receiving means 60 receives and decodes burst signal 220 from multiple access channel 17 and then transfers frame 221 subtracted by a synchronization word to error detection means 61. Upward signal receiving unit 60 also transfer receiver enable signal 222 to upward traffic measurement means 67, during receiving burst signal 220.

Error detection means 61 executes error detection by using error detection code in inputted frame 221 in order to transfer frame 221 subtracted by the error detection code, when there is no error. On the other hand, when error has been detected, frame 221 is discarded.

Separation means 62 analyzes frame 223, after the error detection has been executed. When frame 223 contains user data and is addressed to one or more user stations connected to broadcast type channel 16, frame 223 becomes turn-around data 224 to be transferred to transmission buffer 64. On the other hand, when frame 223 is user data and is addressed to the other user stations connected to the broadcast type channel, frame 223 becomes user data 226 to be transferred to router 13 as shown in FIG. 1. Further, when frame 223 is a reservation packet from the user station, reservation information 225 is extracted and then transferred to reservation information collection means 63.

Transmission buffer 64 receives both user data 227 from router 13 and turn-around data 224 from separation means 62, in order to add data frame identifiers to them in order to transfer them to multiplexer 70.

Scheduling means 65 is activated by timer interrupt 229 from timer interrupt generation means 66. Scheduling means 65 allocates three types of bandwidths; firstly, a bandwidth for data transmission on the basis of reservation information 230 from reservation information collection means 63, secondly, a bandwidth for random reservation, and thirdly, a bandwidth for random access of which quantity is decided by random access bandwidth decision means 68. For example, the bandwidth for random reservation per scheduling may amount to ten reservation packets. Further, the time order of allocating these bandwidths is not limited to the above-mentioned order. After completing the bandwidth scheduling, scheduling means 65 transfers bandwidth allocation information 233 to control frame generation means 69, and sets up the time for starting the next scheduling in timer interrupt generation means 66.

Timer interrupt generation means 66 generates timer interrupt 229 at time 234 which is set up by scheduling means 65.

Upward channel traffic measurement means 67 measures traffic of the multiple access channel 17 on the basis of receiver enable signal 222 from upward signal receiving means 60. The measured traffic 231 is notified to random access bandwidth decision means 68.

Random access bandwidth decision means 68 decides the quantity of bandwidth for random access data on the basis of measured traffic 231. For example, the random access bandwidth may be decided to be 80% of the whole channel bandwidth, when measured traffic 231 is 10% of the whole channel bandwidth. The random access bandwidth may also decided to be, for example, 20% of the whole channel bandwidth, when measured traffic 231 is, for example, 60% of the whole channel bandwidth. Control frame generation means 69 generates control frame 235 on the basis of bandwidth allocation information 233 from scheduling means 65. Control frame 235 is transferred to multiplexer 70 which time-multiplexes data frame 228 and control frame 235 to transfer the time-multiplexed signal to error detection code generation means 71.

Error detection code generation means 71 generates an error detection code to be added to inputted frame 236. Then, it transmits transmission frame 237 to downward signal transmission means 72 which modulates transmission frame 237 in order to transmit the modulated frame allocateal 238, upon broadcast type channel 16.

Figure 7:
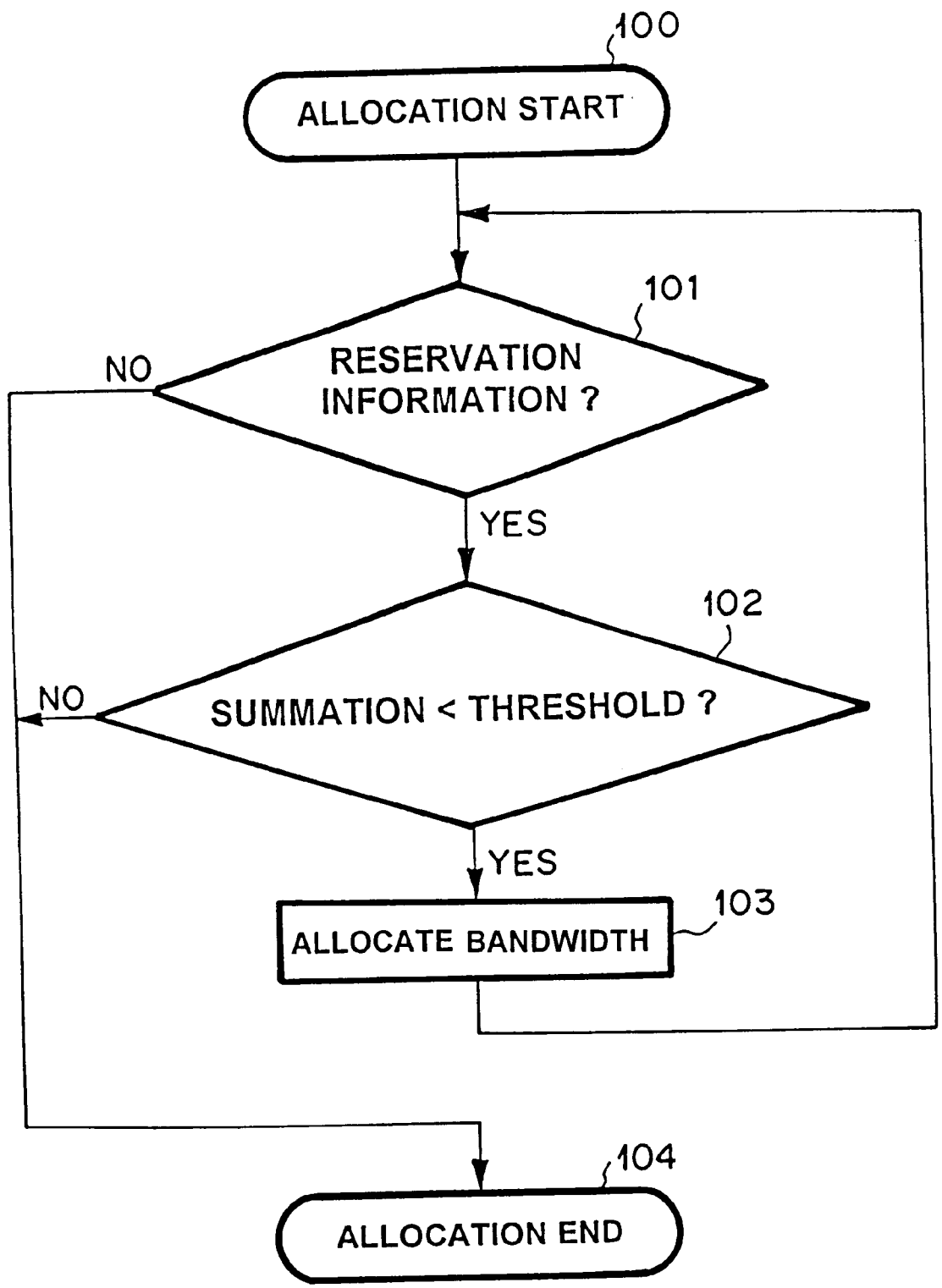
FIG. 7 is a flow chart for data bandwidth allocation by a scheduling means in the key station access control equipment of the first, second and third modes of embodiment of the present invention.

A flow chart for data bandwidth allocation by scheduling means 65 is shown in FIG. 7. After the data bandwidth allocation is started at step 100, reservation information collection means 63 searches whether there is reservation information or not, at step 101. When there is no reservation information, the allocation procedure is ended at step 104. On the other hand, when there is reservation information, the bandwidth already allocated and the bandwidth demanded by the first reservation are summed up at step 102. Then, when the summation is greater than a prescribed threshold, the allocation procedure is ended at step 104. Otherwise, the allocation is executed at step 103, and step 101 is executed again. Here, the prescribed threshold is not necessarily be fixed. Further, the prescribed threshold may be great enough to allocate the data transmission bandwidth for all the reservations.

Second Mode of Embodiment of the Present Invention

In the second mode of embodiment, the transmission control means of the user station is different from that of the first mode of embodiment, although the user station access control equipment is the same. The transmission control means of the user station in the second mode of embodiment acquires the quantity of data which is not yet transmitted, when it transmits random access data or ordinary data. Then, it calculates the difference between the quantity of the untransmitted data and the quantity of data of which transmission is permitted. The difference becomes the quantity which is to be transmitted at next time. Further, it constructs a transmission frame comprising data, reservation information and the address of the user station itself. Thus, the constructed frame is transferred to error detection code generation means 56 as shown in FIG. 5.

Further, in the second mode of embodiment, the separation means of the key station is different from that of the first mode of embodiment, although the key station access control equipment is the same. The separation means of the second mode of embodiment transfers reservation information to reservation information collection means 63, when inputted frame 223 is user data accompanied by the reservation information.

Figure 8:
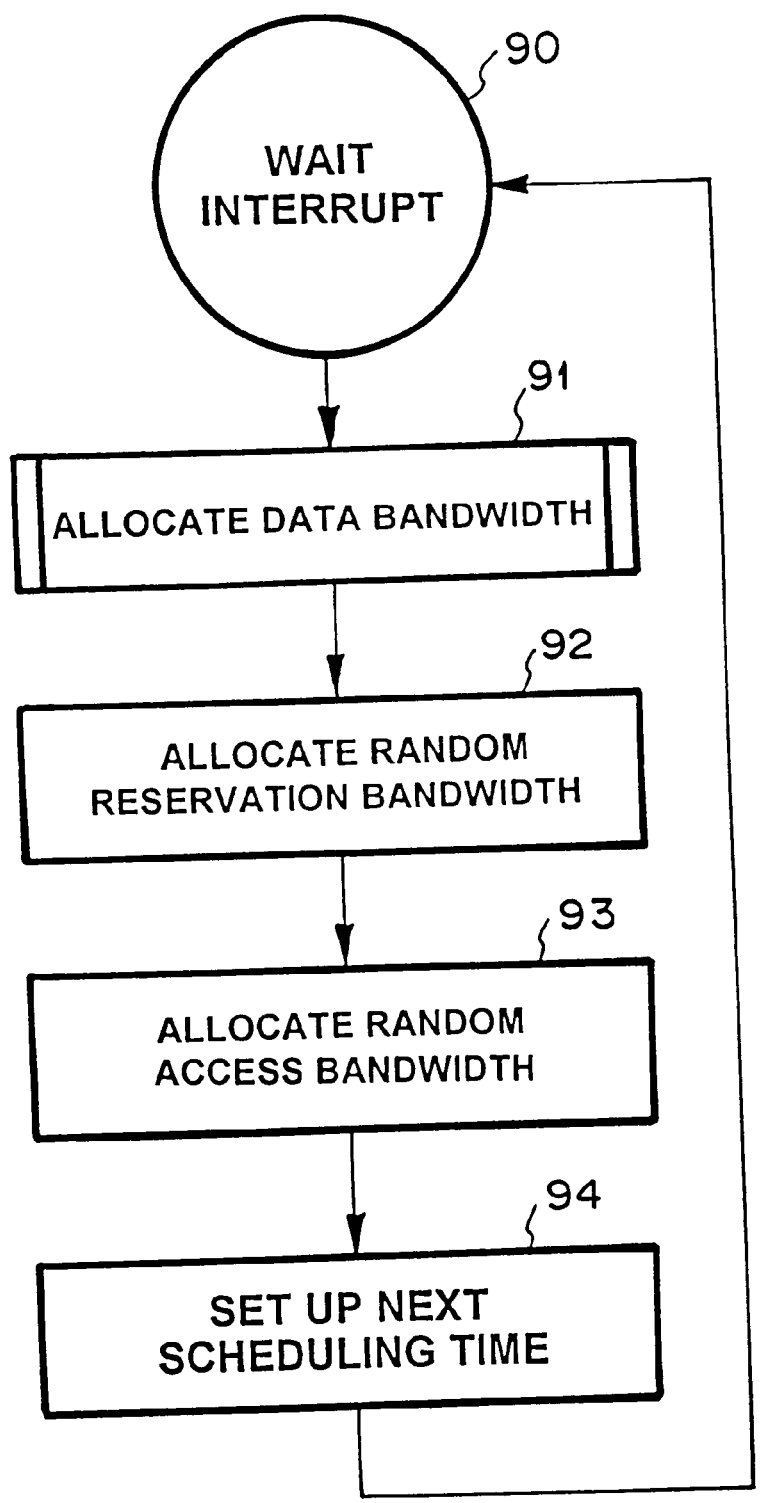
FIG. 8 is a flow chart for allocation procedures for the data bandwidth, random reservation bandwidth and random access bandwidth, the allocation being executed by the scheduling means in the key station access control equipment of the second mode of the present invention.

A flow chart for bandwidth allocation by scheduling means 65 in the second mode of embodiment is shown in FIG. 8. Scheduling means 65 is activated by timer interrupt 229 from timer interrupt generation means 66 at step 90. Then, at step 91, the data transmission bandwidth is allocated for the user station, on the basis of reservation information from reservation information collection means 63. Then, at step 92, a random reservation bandwidth is allocated. Then, at step 93, a random access bandwidth is allocated on the basis of an instruction from random access bandwidth decision means 68. After completing all the scheduling, the next interrupt time is set up in timer interrupt generation means 66, at step 94. The allocation method for data transmission bandwidth, random reservation bandwidth and random access bandwidth is the same as that in the first mode of embodiment.

Third Mode of Embodiment of the Present Invention

Figure 9:
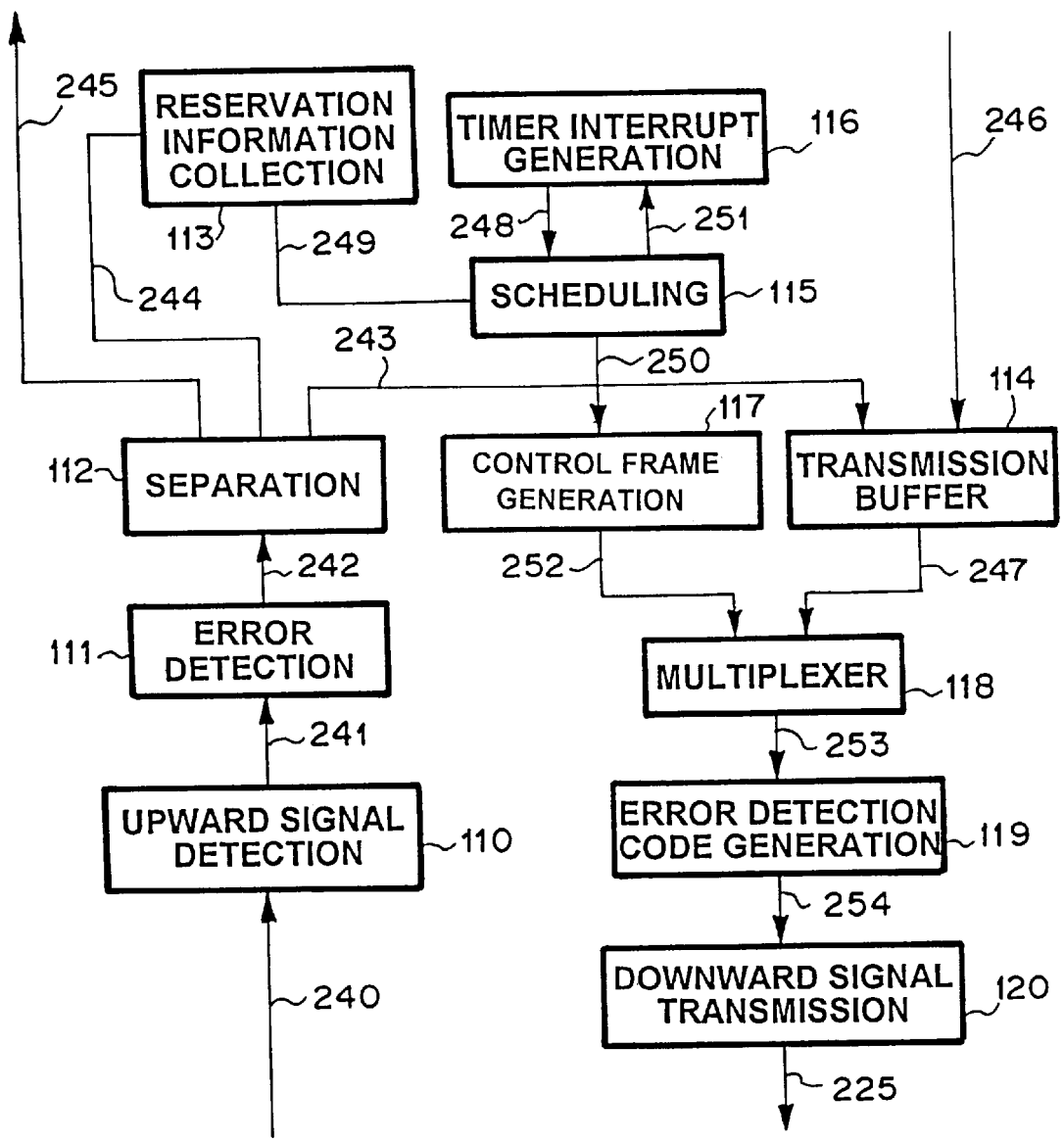
FIG. 9 is a block diagram of a key station access control equipment in the third and fourth modes of embodiment for the present invention.

A block diagram of key station access control equipment of the third mode of embodiment is shown in FIG. 9, wherein the function of each block is the same as that of the second mode of embodiment.

Figure 10:
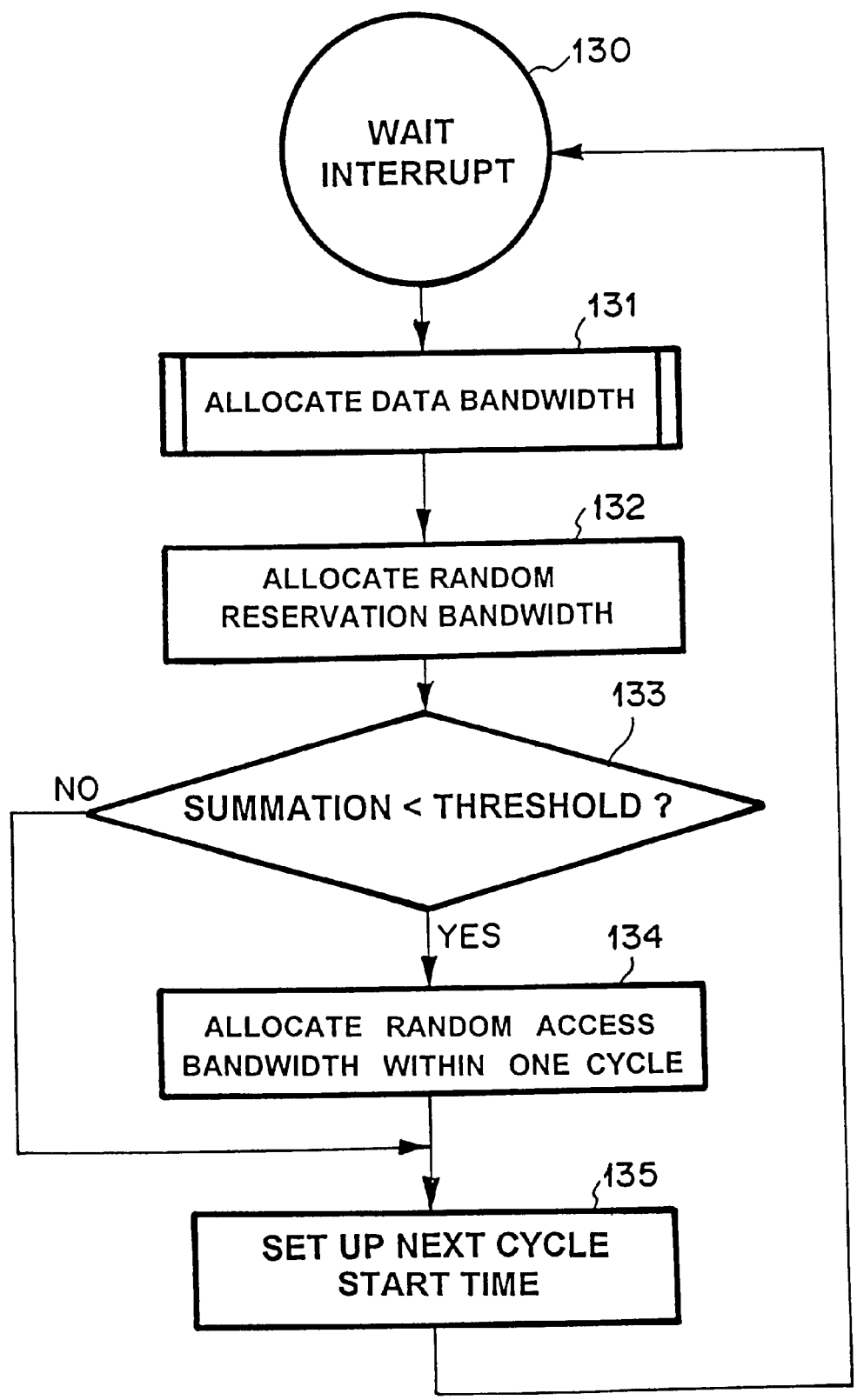
FIG. 10 is a flow chart for the allocation procedures for the data bandwidth, random reservation bandwidth and random access bandwidth, the allocation being executed by the scheduling means in the key station access control equipment of the third and fourth mode of the present invention.

A flow chart for the bandwidth allocation by scheduling means 115 is shown in FIG. 10. Scheduling means 115 executes scheduling at prescribed cycle times. After scheduling means 115 is activated by timer interrupt 248 from timer interrupt generation means 116 at step 130, a data transmission bandwidth is allocated for the user station on the basis of reservation information from reservation information collection means 113 at step 131. Here, the method of the allocation of data transmission bandwidth is the same as that described in FIG. 7, although the prescribed threshold here is set up to be the bandwidth for one cycle time. Next, at step 132, a random reservation bandwidth is allocated. Then, at step 133, it is checked whether the bandwidth already allocated by the scheduling of this time is smaller than the threshold, or not. When the above-mentioned bandwidth is smaller than the threshold, random access bandwidth within the above-mentioned one cycle limitation is allocated at step 134. After completing all the scheduling, the time for starting the next scheduling is set up in timer interrupt generation means 116.

Fourth Mode of Embodiment of the Present Invention

In the fourth mode of embodiment, reservation information collection means 113 of the third mode of embodiment as shown in FIG. 9 is modified.

Figure 11:
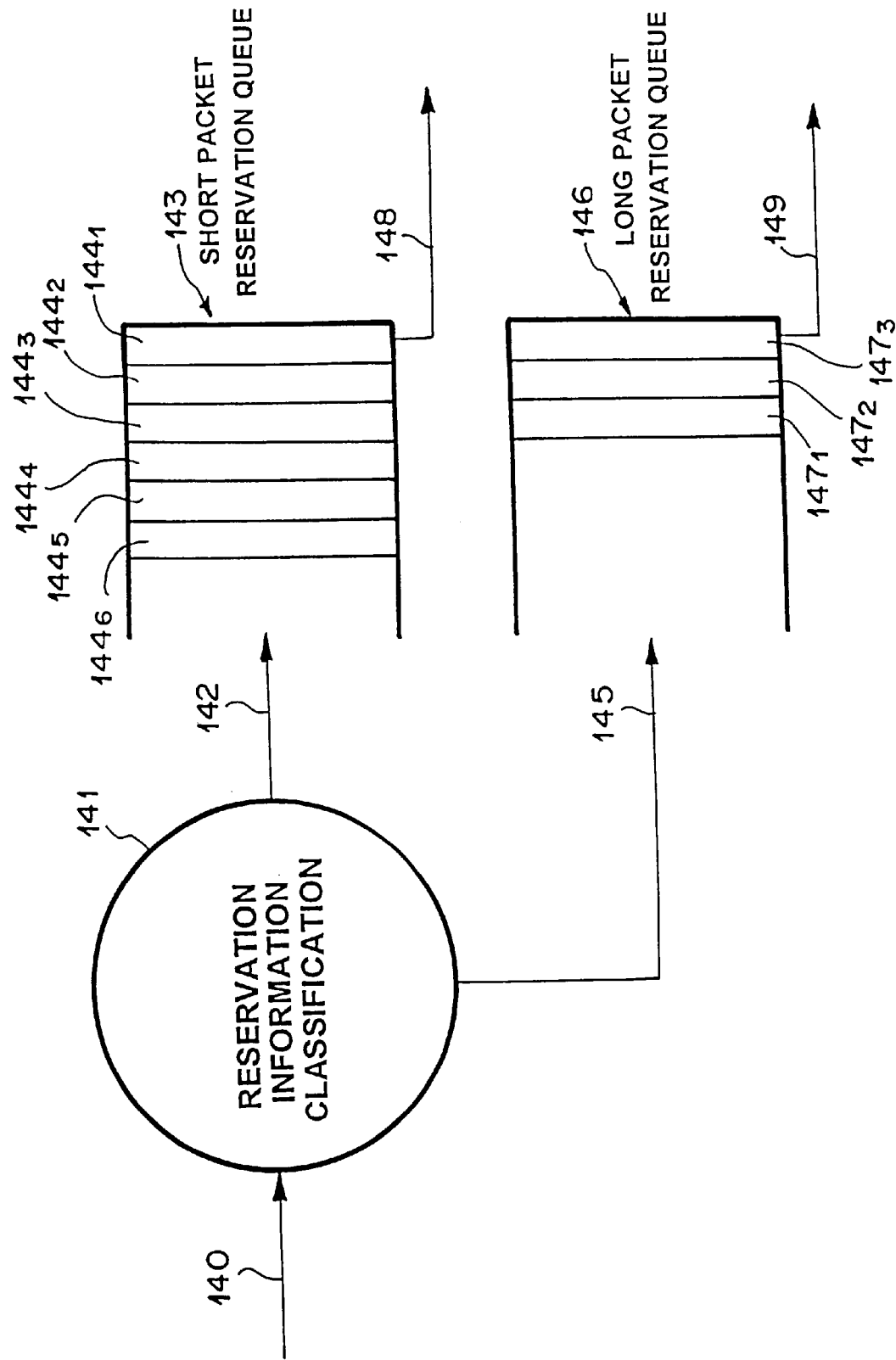
FIG. 11 is a block diagram of a reservation information collection means in the key station access control equipment of the fourth mode of embodiment of the present invention.

A block diagram of the reservation information collection means of the fourth mode of embodiment is shown in FIG. 11. The reservation information collection means of the fourth mode of embodiment comprises reservation information classification means 141, short packet reservation queue 143, and long packet reservation queue 146. When reservation information collection means 113 receives reservation information 140, reservation information classification means 141 compares the quantity of reservation with a prescribed threshold. It inserts reservation information 140 smaller than or equal to the prescribed threshold into short packet reservation queue 143, while it inserts reservation information 140 greater than the prescribed threshold into long packet reservation queue 146.

Number of packets stored in short packet reservation queue 143 and long packet reservation queue 146 is not limited to an example as shown in FIG. 11, wherein 6 short packet reservations $144_1$ to $144_6$ and 3 long packet reservations $147_1$ to $147_3$ are stored. Scheduling means 115 searches reservation information by designating short packet reservation or long packet reservation, and then, the reservation information collection means reads out them sequentially from the head in the designated queue. In an example as shown in FIG. 11, reservation information $144_1$, or $147_1$ is read out at first.

Figure 12:
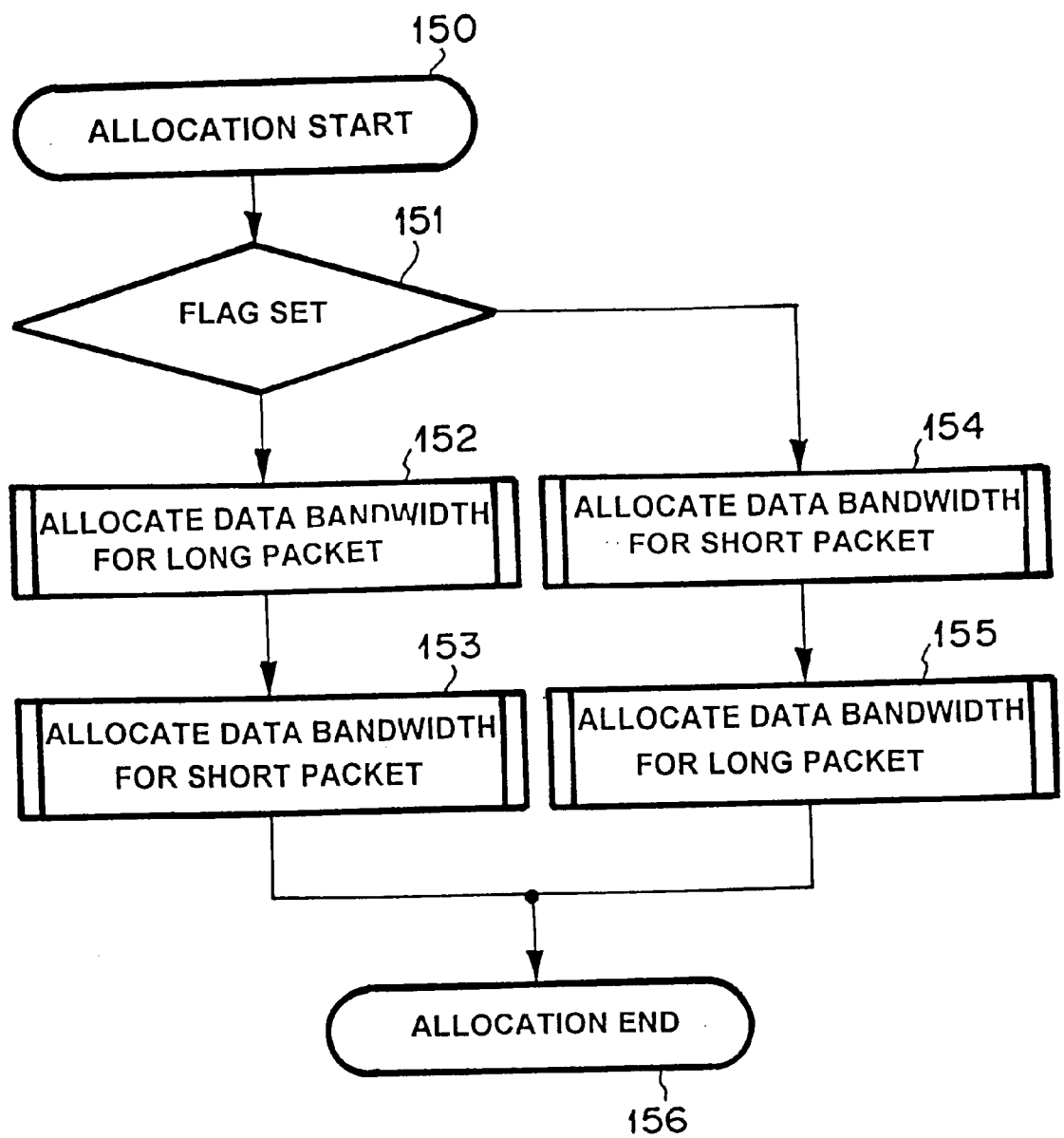
FIG. 12 is a flow chart for bandwidth allocation by the scheduling means in the fourth mode of embodiment of the present invention.

A flow chart for the allocation of data transmission bandwidth in the fourth mode of embodiment is shown in FIG. 12. Scheduling means 115 holds a flag which indicates that, at the last scheduling, there was reservation information stored in long packet reservation queue, but no bandwidth was allocated for long data transmission. The allocation of data transmission bandwidth is started at step 150. When the above-mentioned flag is set, bandwidths are allocated firstly for long packets at first at step 152, and then for short packets at step 153. On the other hand, when the flag is not set, bandwidths are allocated firstly for short packets at step 154, and then for long packets at step 155.

Figure 13:
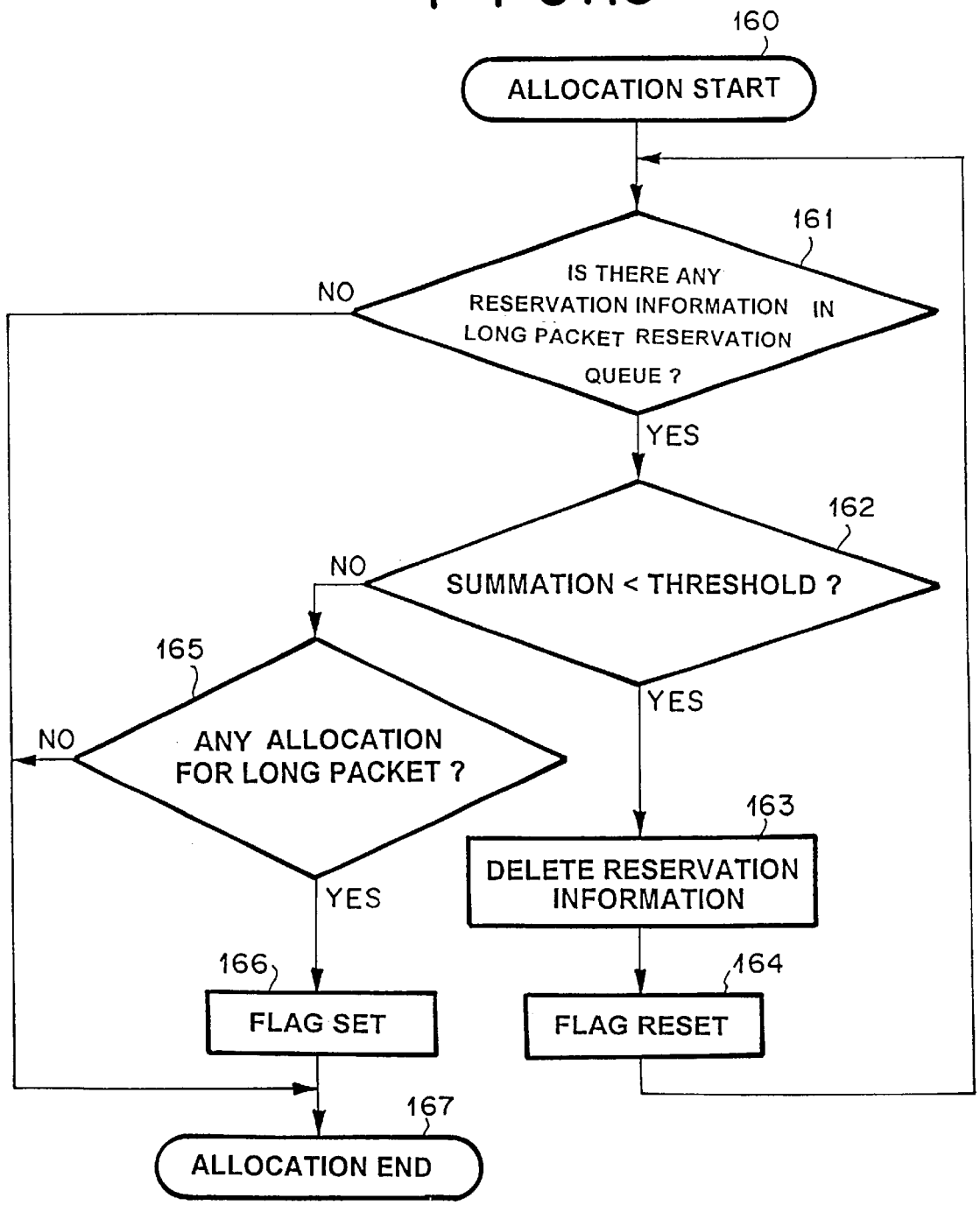
FIG. 13 is a flow chart for bandwidth allocation for long packets by the scheduling means in the fourth mode of embodiment of the present invention.

A flow chart for the allocation of data transmission bandwidth for long packet in the fourth mode of embodiment is shown in FIG. 13. After the allocation is started at step 160, the reservation information collection means searches whether there is any reservation information or not, at step 161. When there is no reservation information for long packet, the allocation procedure is ended at step 167. On the other hand, when there is reservation information for long packet, the bandwidth already allocated and the demanded bandwidth of the reservation information at the head of long packet reservation queue 146 are summed up, and then, the summation is compared with a prescribed threshold for one cycle time, at step 162. When the summation is greater than the prescribed threshold, step 165 is executed. When no bandwidth has been allocated for long packet by the scheduling at the present cycle time, the flag is set at step 166. On the other hand, when the allocation of bandwidth for long packets has been executed, the allocation procedure is ended at step 167. On the other hand, at step 162, when the summation is smaller than or equal to the prescribed threshold, the allocation of long data bandwidth is executed, and then, reservation information is discarded from long packet reservation queue 146, and finally the flag is reset at step 164. Following step 164, the procedures from step 161 are repeated, until the reservation information stored in long packet reservation queue 146 are exhausted, or until the summation becomes greater than the prescribed threshold.

Figure 14:
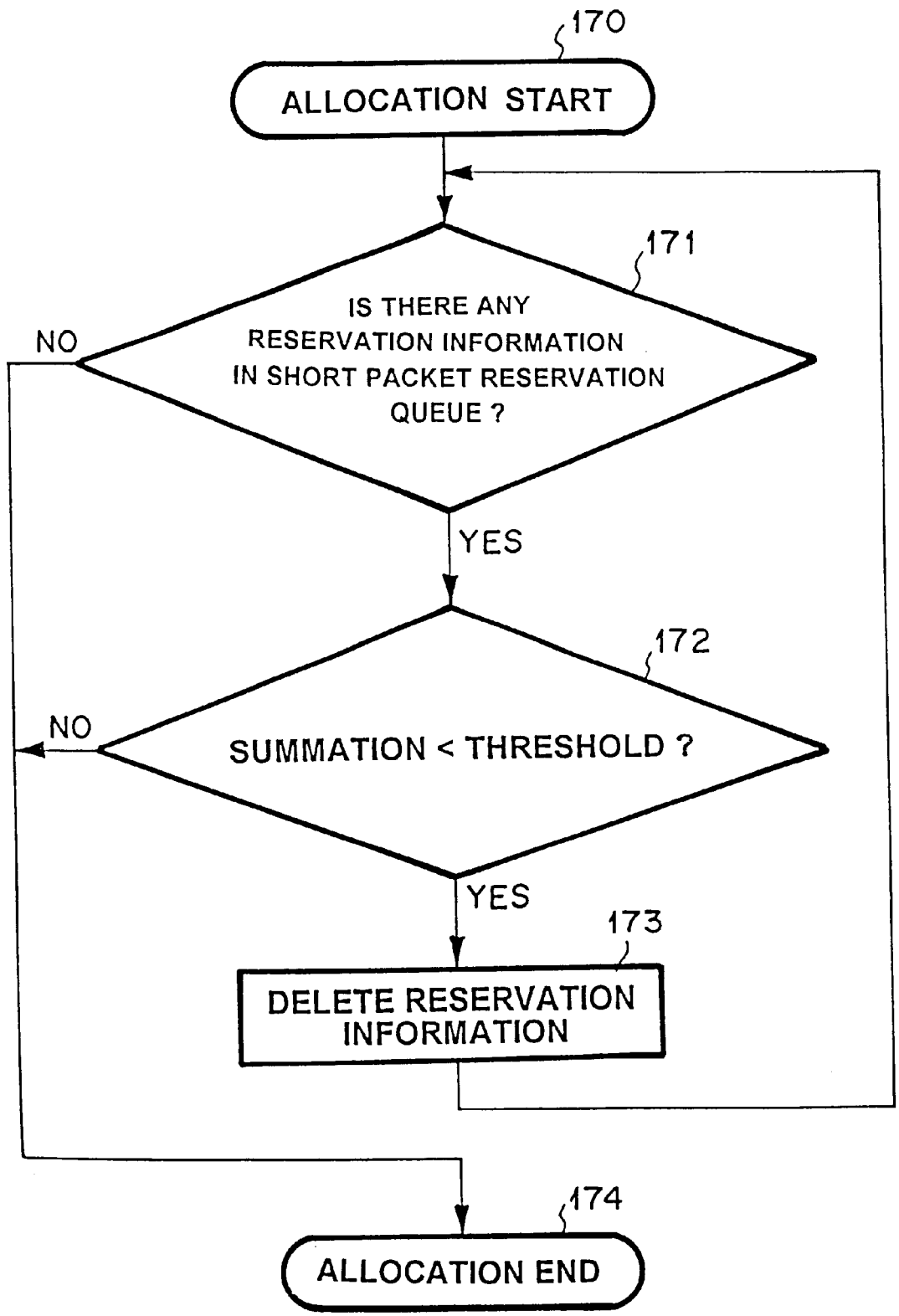
FIG. 14 is a flow chart for bandwidth allocation for short packets by the scheduling means in the fourth mode of embodiment of the present invention.

A flow chart for the allocation for short packet is shown in FIG. 14, which is the same as that for long packet as shown in FIG. 13, except that short packet reservation queue 143 is used without any need for setting and resetting the flag.

What is claimed is:

1. A multiple access communication system comprising:

a key station;

a plurality of user stations that communicate with the key station;

a broadcast channel for transmitting downward data and control signals from the key station; and a multiple access channel for transmitting upward data from the plurality of user stations, wherein:

said key station transmits, through said broadcast channel, access control signals, each of which includes user station addresses, transmission timing, random reservation bandwidth, and random access bandwidth;

each of said user stations, which have received said random reservation bandwidth, transmits, through said multiple access channel, reservation information which includes user station address and reservation quantity;

each of said user stations, which have received said random access bandwidth, transmits random access data through said multiple access channel; and wherein said key station measures traffic of said multiple access channel and determines a ratio of said random access bandwidth to a whole channel bandwidth on the basis of said traffic.

2. The multiple access communication system according to claim 1, wherein:

said access control signals further include data transmission bandwidth; and each of said user stations, which have received said data transmission bandwidth, transmits data.

3. The multiple access communication system according to claim 1, wherein:

said key station transmits information of data transmission bandwidth on the basis of said reservation information, when it has received said reservation information; and each of said user stations, which have received said information, transmits data.

4. The multiple access communication system according to claim 2, wherein said user stations transmit said reservation information to be transmitted at next time together with said data permitted which is now to be transmitted.

5. The multiple access communication system according to claim 3, wherein said user stations transmit said reservation information to be transmitted at next time together with said data permitted which is now to be transmitted.

6. The multiple access communication system according to claim 2, wherein said key station allocates at first said data transmission bandwidth, then allocates said random reservation bandwidth, and finally allocates said random access bandwidth.

7. The multiple access communication system according to claim 2, wherein said key station allocates bandwidth at a prescribed cycle time, and said key station allocates at first said data transmission bandwidth, then allocates said random reservation bandwidth, and finally allocates said random access bandwidth by utilizing the remainder of bandwidth at the prescribed cycle time.

8. The multiple access communication system according to claim 1, wherein said key station comprises a reservation information classification means, a long packet reservation queue and a short packet reservation queue; and said reservation information classification means compares said reservation quantity included in said reservation information with a prescribed threshold, inserts said reservation information into said long packet reservation queue when said reservation quantity is larger than the prescribed threshold and inserts said reservation information into said short packet reservation queue when said reservation quantity is equal to or less than the prescribed threshold.

9. The multiple access communication system according to claim 8, wherein:

when at the present time said key station allocates a data bandwidth for transmitting said data for said long packet reservation queue, said key station allocates, at the next cycle time, said data bandwidth firstly for said short packet reservation queue and secondly for said long packet reservation queue; and when at the present time said key station refuses to allocate a data bandwidth for transmitting said data for said long packet reservation queue, said key station allocates, at the next cycle time, said data bandwidth firstly for said long packet reservation queue and secondly for said short packet reservation queue.

* * * * *